(12) United States Patent
Turgut

(10) Patent No.: US 12,119,714 B1
(45) Date of Patent: Oct. 15, 2024

(54) ROTOR FOR A HIGH SPEED ELECTRICAL MACHINE

(71) Applicant: Government of the United States, as represented by the Secretary of the Air Force, Wright-Patterson AFB, OH (US)

(72) Inventor: Zafer Turgut, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/220,893

(22) Filed: Jul. 12, 2023

Related U.S. Application Data

(62) Division of application No. 17/074,837, filed on Oct. 20, 2020, now Pat. No. 11,742,711.

(60) Provisional application No. 62/937,292, filed on Nov. 19, 2019.

(51) Int. Cl.
| | |
|---|---|
| H02K 1/30 | (2006.01) |
| H02K 1/27 | (2022.01) |
| H02K 1/2781 | (2022.01) |
| H02K 15/03 | (2006.01) |

(52) U.S. Cl.
CPC ............. H02K 1/30 (2013.01); H02K 1/2781 (2022.01); H02K 15/03 (2013.01)

(58) Field of Classification Search
CPC ......... H02K 1/30; H02K 1/2781; H02K 15/03
See application file for complete search history.

(56) References Cited

U.S. PATENT DOCUMENTS

| | | |
|---|---|---|
| RE34,667 E | 7/1994 | Neumann |
| 6,069,421 A | 5/2000 | Smith et al. |
| 6,784,588 B2 | 8/2004 | DeCristofaro et al. |
| 6,930,427 B2 | 8/2005 | Grant et al. |
| 2006/0061227 A1* | 3/2006 | Heideman ............ H02K 1/2773 310/156.47 |
| 2009/0224627 A1 | 9/2009 | Hino et al. |
| 2019/0363618 A1* | 11/2019 | Zhu ........................ H02K 15/02 |

* cited by examiner

*Primary Examiner* — Thomas Truong
(74) *Attorney, Agent, or Firm* — AFMCLO/JAZ; Matthew D. Fair

(57) ABSTRACT

A unique rotor assembly for an electrical machine is disclosed herein. The rotor assembly includes a shaft having an axis of rotation extending within the electrical machine. A central support is connected to the shaft at an intermediate position and a pair of opposing end plates are configured to clamp a plurality of laminate plates therebetween. The laminate plates and a sidewall of the end plates have a non-linear cross-sectional shape such that radial loading due to centrifugal force is transmitted from the laminate plates to the end plates during operation.

12 Claims, 3 Drawing Sheets

ROTOR FOR A HIGH SPEED ELECTRICAL MACHINE

This is a Divisional Application of application Ser. No. 17/074,837 filed on Oct. 20, 2020, which in turn claims the benefit of and priority to prior filed Provisional Application Ser. No. 62/937,292, filed Nov. 19, 2019 which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a rotor for an electrical machine such as an electric motor or generator and the like.

BACKGROUND

Electrical machines typically include a rotor sometimes called a rotor core positioned radially inward of a stator as in the case of radial flux electric machines. The rotor is subjected to mechanical loading during operation due to centrifugal forces generated by high rotational speeds. In some designs, permanent magnets may be embedded inside the rotor and in other designs, the rotor may include electrical windings or no windings. The rotor typically includes a plurality of separate laminate plates positioned adjacent one another and electrically insulated to limit eddy current losses. End caps or plates are clamped at either end of the rotor to hold the stacked laminations in place. The laminations and end caps can be shrink fitted or welded onto a rotatable shaft such that torque can be transmitted through the shaft. The rotational speed of the electrical machine can be limited due to mechanical load limits of the rotor laminations. As such, some existing systems have various shortcomings, drawbacks, and disadvantages relative to certain applications. Accordingly, there remains a need for further contributions in this area of technology.

SUMMARY

One embodiment of the present disclosure includes a unique rotor for a radial electrical machine. Other embodiments include apparatuses, systems, devices, hardware, methods, and combinations wherein the rotor includes a unique laminate and end plate design to increase high speed capability of the machine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
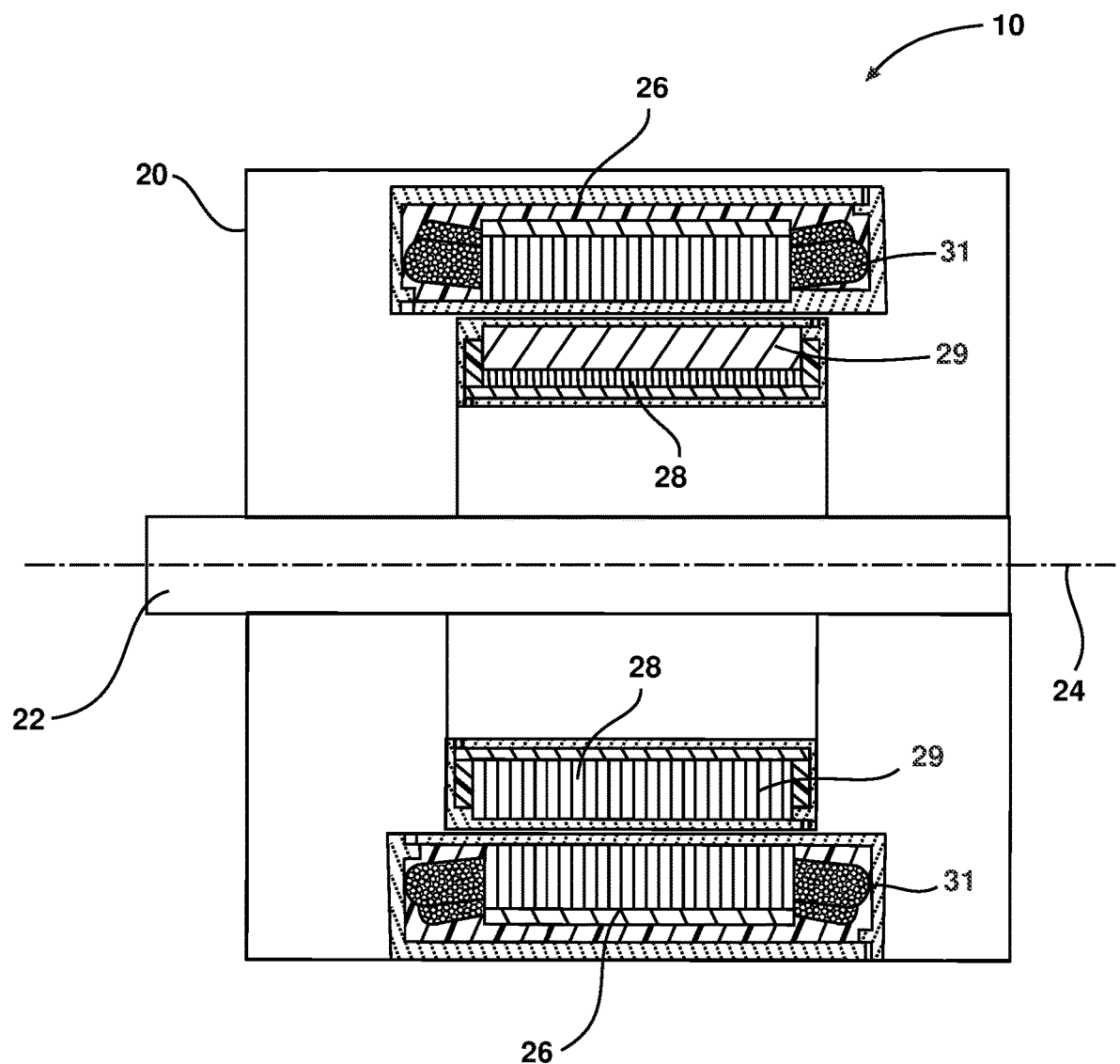
FIG. 1 is a cross-sectional view of an electrical machine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The power density of an electrical machine can be increased by increasing the rotational speed of the rotor. However, mechanical properties and magnetic performance of the rotor materials limit the speed of the rotor. The rotor is subjected to both circumferential hoop stress and radial stress during rotation as is known to those skilled in the art. These stresses are proportional to the square of the rotational velocity; this effect is known as centrifugal force. Thus, increasing rotational velocity requires a stronger material; i.e., a magnetic material with a higher yield strength. Magnetic materials for rotating machinery can be tailored and processed to have an optimum balance between magnetic performance and mechanical performance as these two properties work against each other. Typically metallurgical mechanisms that improve mechanical strength degrade magnetic performance, so the yield strength of commonly used magnetic laminations are relatively low compared to materials with lower magnetic performance such as steel.

Higher rotational speeds also increase frequency of magnetic reversal that the rotor experiences during operation. Due to their metallic nature, magnetic materials possess relatively low electrical resistivity values, which makes them highly susceptible to eddy currents and related losses. The metallic magnets are formed in thin lamination sheets or plates to confine the eddy currents within electrically insulated thicknesses of laminates and to reduce related electrical losses. Regardless of how fast the rotor spins, there is a benefit in reducing the lamination thickness for reduced eddy current losses. Thinner laminations however, decrease strength and stiffness of the rotor and thus limit the speed capability thereof.

Reducing the stress in the laminate plates permits increased design flexibility by allowing higher tip speeds for a given rotor core diameter or enabling larger core diameters and smaller L/R (length/radius) ratios resulting in a smaller total stator and rotor electromagnetic volume. Larger rotor diameters allow larger slot depths for wound rotors hence higher electric loading and shear stress. Other advantages of having a smaller L/R ratio are larger shaft diameters and higher critical speeds. Rotor cores with smaller L/R ratio are also easier to cool compared to rotors with larger stack lengths. In addition to the improved stiffness provided by the large axial clamping force of embodiments described herein, smaller L/R ratios also contribute to the stiffness of the rotor as rotor cores with smaller L/R are less prone to deflection during operation. Improved stiffness allows tighter tolerances for the air gap between the rotor and stator which reduces leakage flux and magnetizing power requirements improving overall efficiency. Reduced leakage flux due to tighter air gap also leads to smaller machine volume.

For common magnetic laminates of silicon steels, Fe—Co and Fe—Ni, the end plate materials may include, but are not limited to Inconel, titanium, steel, beryllium, metal matrix composites, ceramic matrix composites, and silicon carbide as well as alloys and mixtures thereof. Further, carbon or glass fiber sleeves may be formed around the end plates and central support to further inhibit radial growth.

In some forms, amorphous and nanocrystalline materials may be used in the lamination plates. Amorphous and nanocrystalline materials offer superior magnetic performance due to their extremely low losses and excellent high frequency properties, compared to their conventional counterparts of Fe—Si, Fe—Co and Fe—Ni. Amorphous and nanocrystalline lamination plates provide high frequency performance enabled by their relatively high electrical resistivities of 110-130 μohm-cm and micro-thicknesses (13-25 μm) which permit higher frequency machine operation improving overall efficiency and reducing machine size and weight. The high frequency performance allows machines with high pole counts which provides high torque and power values for a wide range of operating speeds and frequencies. Because the amorphous and nanocrystalline lamination plates have lower losses, heat generation is reduced and thus cooling requirements are reduced thereby improving operational efficiency.

Referring now to FIG. 1, a cross-sectional view of an electrical machine 10 is illustrated therein. The electrical machine 10 includes a housing 20 for holding the static and rotating components necessary to generate electrical power or mechanical output. A rotatable shaft 22 rotates about an axis of rotation 24 within the housing 20. A stator 26 operable to produce a magnetic flux is positioned radially outward of a rotor assembly 28. When operating as an electrical generator, the electrical machine 10 receives mechanical input to rotate the shaft 22 and produce electrical current through operation of a magnet assembly 29 rotating across a coil 31 formed within the stator 26 as is known to those skilled in the art. When operating as an electric motor, the electrical machine 10 directs electric current through the coil 31 of the stator 26 which produces a magnetic flux sufficient to produce an electromotive force (EMF) with the magnet assembly 29 and cause rotation of the shaft 22 as is also known to those skilled in the art.

Figure 2:
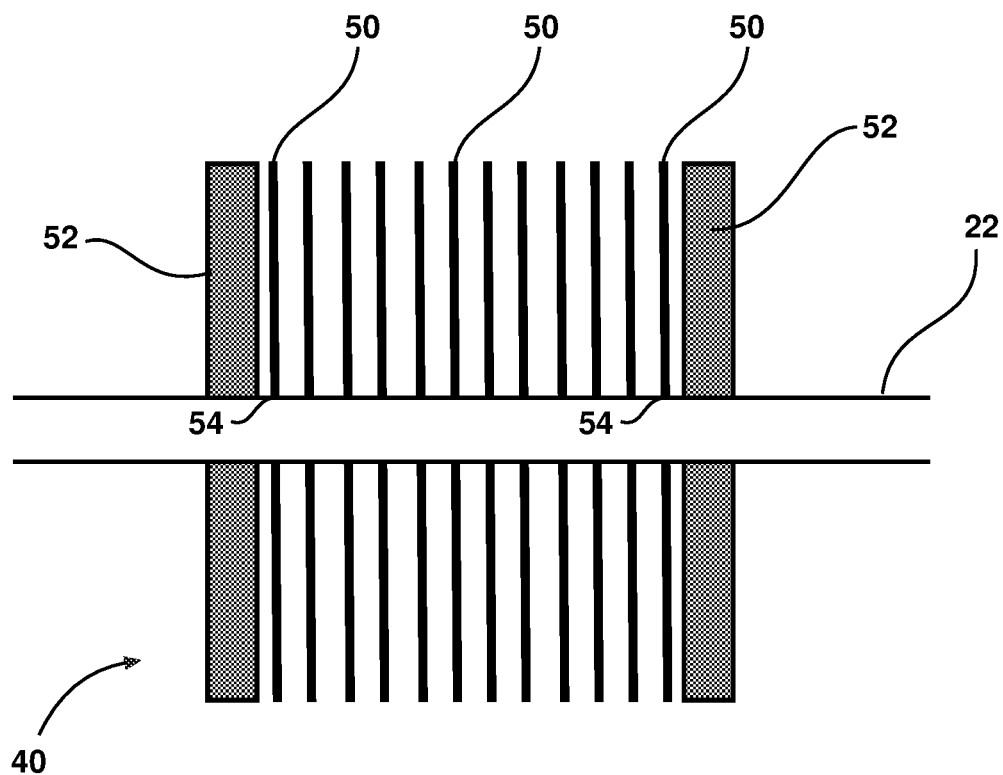
FIG. 2 is a schematic cross-sectional view of a prior art rotor operable in the electrical machine of FIG. 1.

Referring now to FIG. 2, a cross-sectional schematic view of a conventional prior art rotor assembly 40 is depicted. The rotor 40 includes a shaft 22 with a plurality of magnetic laminate plates 50 stacked together with end plates or end caps 52 positioned on either end thereof to clamp the laminate plates 50 together. In the depicted embodiment, the lamination plates 50 are spaced apart for clarity, but it should be understood that the plates 50 actually engage one another when finally assembled on the shaft 22. The laminate plates 50 have a substantially flat disk shaped cross-section with a central aperture 54 that is pressed or heat shrinked onto the shaft 22. The end plates 52 provide an axial loading through a clamping force on the laminate plates 50. During operation, the centrifugal force acts on the laminate plates 50 with no support from the end plates 52 in the radial direction (e.g. normal to the axis of rotation). Therefore, the rotational speed of the rotor assembly 40 is limited by the mechanical properties of the laminate plates 50.

Figure 3:
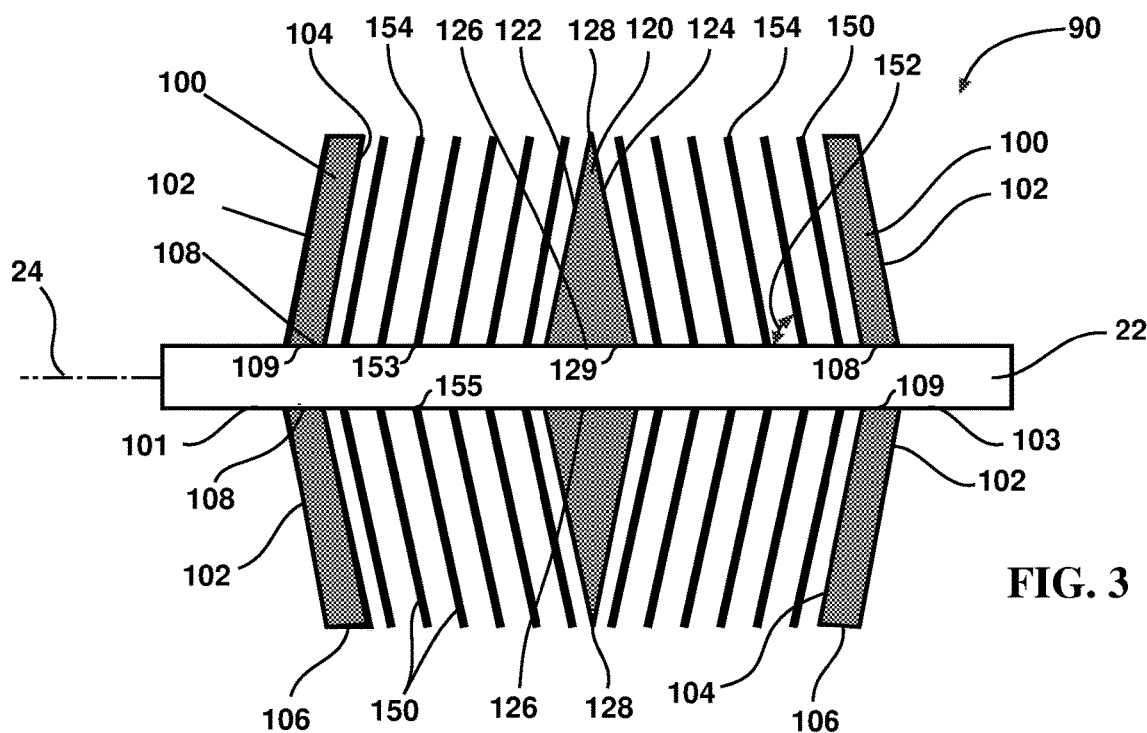
FIG. 3 is a schematic cross-sectional view of a rotor according to one embodiment of the present disclosure.

Referring now to FIG. 3, a rotor assembly 90 according to one embodiment of the present disclosure is depicted. The rotor assembly 90 includes a shaft 22 with first and second conical end plates 100 connected at opposing ends 101, 103 respectively, thereof. The end plates 100 include an outer wall 102 spaced apart from an inner wall 104 to define a thickness thereof. In the depicted form, the inner and outer walls 102, 104 of the end plates 100 are substantially parallel and have an inwardly projected angle or conical shape, however the inner and outer walls 102, 104 are not parallel in some embodiments. In other forms, the inner wall 104 has an inwardly projected angle (conical cross-sectional shape) and the outer wall 102 can have a different shape and different thicknesses such as radially flat (disk shaped), curved or some other geometric configuration. The end plates 100 are further defined by an end wall 106 forming an outer perimeter of the rotor assembly 90 and an inner hub 108 forming a circular aperture 109 engaged around the shaft 22. The end plates 100 may be connected to the shaft 22 via press fit, weld, heat shrink, braze or other mechanical means as would be known to those skilled in the art.

A central support 120 is positioned on the shaft 22 at an intermediate position between the first and second end plates 100. In some forms the central support 120 is located at a precise center of the shaft 22 and in other forms the central support 120 is positioned off center of the shaft 22. The central support 120 extends radially outward from the shaft 22 with an angled first wall 122 and an angled second wall 124 that project from a hub wall 126 toward one another and terminate at an end wall 128. The end wall 128 forms an outer perimeter of the central support 120. The central support 120 further includes a circular aperture 129 formed by the hub wall 126 which is engaged around the shaft 22. Similar to the end plates 100, the central support 120 may be connected to the shaft 22 via press fit, weld, heat shrink, braze or other mechanical means. The angle of the first and second walls 122, 124 relative to the axis of rotation 24 of the shaft 22 can be similar to the angle of the conically shaped inner walls 104 of the end plates 100.

A plurality of laminate plates 150 are positioned between each of the end plates 100 and the central support 120. The laminate plates 150 are formed in a conical shape with an angle 152 relative to the axis of rotation 24 of the shaft 22. The angle 152 is less than ninety degree (90°) and is substantially similar to the angle of the conical shape of the inner walls 104 of the end plates 100. As the angle 152 of the walls are reduced, the overlap of the adjacent laminate plates 150 and end plates 100 increase the radial direction (normal to the axis of rotation). The laminate plates 150 extend radially outward and in an axial direction due to the extension of the wall from a hub 153 to a perimeter end 154 at an angle 152. The hub 153 forms a circular aperture 155 sized to fit around the shaft 22. Each of the laminate plates 150 may be permanently attached to the shaft via any mechanical means known in the art similarly to the end plates 100 and central support 120. In some forms one or more of the laminate plates 150 may be free to float on the shaft 22 to facilitate thermal expansion or the like during operation while being held in position by friction contact between adjacent plates 150. In this manner, when the rotor assembly 90 is assembled, the laminate plates 150 are stacked so as to contact one another and where the inner most laminate plates 150 contact the central support 120 and the outer most laminate plates 150 contact the end plates 100. The central support 120 fills the void created by the slanted conical configuration of the laminate plates 150 at an intermediate position as they are stacked from either end 101, 103 of the shaft 22.

Once the laminate plates 150 are stacked together and assembled on the shaft 22, the laminate plates 150 are compressed together by opposing end plates 100 to create an axial clamping force sufficient to hold the laminate stack in a fixed or semi-fixed position. The angular projection of the end plates 100 and the laminate plates 150 provide a radial clamping load between adjacent plates due the radial overlap (radial contact) and frictional forces transmitted therebetween. The end plates 100 are designed to be substantially stronger than the laminate plates 150 due to increased width and/or the material selected. The end plates 100 may be formed from a material that has reduced magnetic transmission capability, but with increased material strength (yield strength capability) properties. The end plate 100 material may have better mechanical properties than that of magnetic laminate plates 150. The material of the end plates may have higher yield strength, higher specific modulus, smaller Poisson's ratio and/or lower thermal expansion coefficient as compared to the materiel of the laminate plates 150.

Because the laminate plates 150 are nested under the inner wall 104 of the end plates 100, the centrifugal loads acting on the laminate plates 150 can be transmitted to and carried by the end plates 100. The angled end plates 100 impede the radial growth of lamination plates and ultimately lower their stress (hoop, tensile, bending etc.) during rotation. The frictional forces due to the overlap design coupled with the axial clamping force created by the end plates 100 improve overall stiffness of the rotor core and permit higher rotational speeds of the rotor assembly 90 relative to a traditional flat disk laminate plate design.

Figure 4:
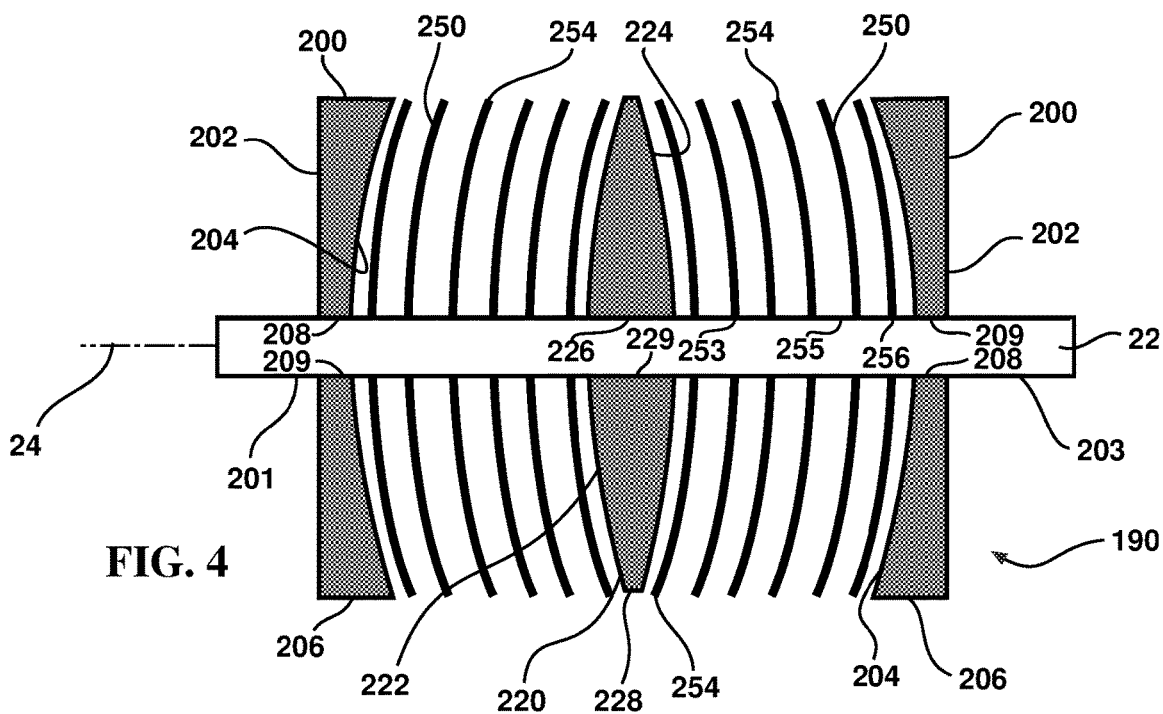
FIG. 4 is a schematic cross-sectional view of a rotor according to another embodiment of the present disclosure.

Referring now to FIG. 4, a rotor assembly 190 according to another embodiment of the present disclosure is depicted. The rotor assembly 190 includes a shaft 22 with first and second arcuate end plates 200 that include a curved concave shape connected at opposing ends 201, 203 respectively, thereof. The end plates 200 include an outer wall 202 spaced apart from an inner wall 204 to define a thickness thereof. In the depicted form, the outer walls 202 are substantially flat and the inner arcuate walls 204 of the end plates 200 have a curved concave shape projecting inward toward the center of the shaft 22. In other forms, the outer walls 202 may have a different geometric shape other than the flat shape shown. The end plates 200 are further defined by an end wall 206 forming an outer perimeter of the rotor assembly 190 and an inner hub 208 forming a circular aperture 209 engaged around the shaft 22. Similar to the previous embodiment, the end plates 200 may be connected to the shaft 22 via press fit, weld, heat shrink, braze or other mechanical means as would be known to those skilled in the art.

A central support 220 is positioned on the shaft 22 at an intermediate position between the first and second end plates 200. In some forms, the central support 220 is located at a precise center of the shaft 22 and in other forms the central support 220 is positioned off center of the shaft 22. The central support 220 extends radially outward from the shaft 22 with a first arcuate convex sidewall 222 and a second opposing arcuate convex sidewall 224 that project from a hub wall 226 and terminate at an end wall 228. The end wall 228 forms an outer perimeter of the central support 220. The central support 220 is further includes a circular aperture 229 formed by the hub wall 226 which is engaged around the shaft 22. Similar to the end plates 200, the central support 220 may be connected to the shaft 22 via press fit, weld, heat shrink, braze or other mechanical means. The first and second arcuate side walls 222, 224 generally extend in both a radial direction and an axial direction relative to the axis of rotation 24 of the shaft 22. The arcuate shape of the side walls 222, 224 can be similar to the arcuate shape of the inner walls 104 of the end plates 100 such that in an assembled position the side walls 222, 224 are effectively nested within the end plates 100 and a portion of the radial loads are transmitted to the end plates 100 during operation.

A plurality of laminate plates 250 are positioned between each of the end plates 200 and the central support 220. The laminate plates 250 are formed in an arcuate shape with a concave curve projected toward the central support 220. The arcuate shape of the laminate plates 250 is substantially similar to the arcuate shape of the inner walls 204 of the end plates 200 and the arcuate side walls 222, 224 of the central support 220. The laminate plates 250 extend radially outward from a hub 253 to a perimeter end 254. The hub 253 forms a circular aperture 255 sized to fit around the shaft 22. Each of the laminates plates 250 may be permanently attached to the shaft 22 via any mechanical means known in the art similarly to the end plates 200 and central support 220. In some forms, one or more of the laminate plates 250 may be free to float on the shaft 22 to facilitate thermal expansion or the like during operation. When the rotor assembly 190 is assembled, the laminate plates 250 are stacked so as to contact one another such that the inner most laminate plates 250 contact the central support 220 and the outer most laminate plates 250 contact the end plates 200.

The central support 220 fills the void created by the curved configuration of the laminate plates 250 where they meet in the middle of the shaft 22. Once the laminate plates 250 are stacked together and assembled on the shaft 22, the laminate plates 250 are compressed together by the opposing end plates 200 to create an axial clamping force sufficient to hold the laminate plate 250 stack in a fixed or semi-fixed position. The arcuate projection of the end plates 200 and the laminate plates 250 provide a radial clamping load between adjacent plates due the radial overlap (radial contact) and frictional forces transmitted therebetween.

The end plates 200 are designed to be substantially stronger than the laminate plates 250 due to increased width and/or the design material selected. The end plates 200 may be formed from a material that has reduced magnetic transmission capability, but with increased material strength (yield strength capability) properties. Because the laminate plates 250 are nested under the inner wall 204 of the end plates 200, the centrifugal loads acting on the laminate plates 250 can be transmitted to and carried by the end plates 200. The arcuate end plates 200 impede the radial growth of lamination plates and ultimately lower their stress (hoop, tensile, bending etc.) during operation. The frictional contact forces caused by the overlap design coupled with the axial clamping force created by the end plates 200 improve overall stiffness of the rotor core and permit higher rotational speeds of the rotor assembly 190 relative to a traditional flat disk laminate plate design.

In one aspect the present disclosure includes an electrical machine comprising: a housing; a shaft positioned in the housing extending along an axis of rotation between first and second ends; a stator winding positioned within the housing; a rotor assembly rotatably supported by the shaft radially inward of the stator winding; a central support connected to the shaft at an intermediate position between the first and second ends; first and second end plates connected to the shaft at the opposing first and second ends thereof; a plurality of laminate plates connected to the shaft between the central support and the first and second end plates; and wherein the laminate plates have a non-linear cross-sectional shape.

In refining aspects, the non-linear shape of the laminate plates is defined by a non-orthogonal angle extending radially outward from the shaft relative to the axis of rotation; wherein the non-linear shape of the laminate plates is defined an arcuate concave shape; wherein each of the end plates include a first sidewall with a non-linear shape substantially equivalent to a non-linear cross sectional shape of the laminate plates; wherein each of the end plates includes a second sidewall having a different shape than that of the first sidewall; wherein the first sidewall includes a concave arcuate shape; wherein the first sidewall includes a non-orthogonal angle extending radially outward from the shaft relative to the axis of rotation; wherein the central support include opposing sidewalls having a non-linear shape corresponding to the non-linear cross sectional shape of the laminate plates; wherein the opposing side walls of the central support have a convex arcuate shape; wherein the opposing side walls of the central support includes a non-orthogonal angle extending radially outward from the shaft relative to the axis of rotation; and permanent magnets positioned on a perimeter end of one or more of the laminate plates.

In another aspect, the present disclosure includes a rotor for an electrical machine comprising: a shaft rotatably supported along an axis of rotation within a housing; a plurality of laminate plates positions along a length of the shaft; a central support positioned at an intermediate location on the shaft, such that a portion of the laminate plates are positioned on either side thereof; first and second end plates connected to the shaft at opposing ends thereof; and wherein a first wall of the end plates engage with and extend over an adjacent one of the plurality of laminate plates in a radial direction.

In refining aspects, a cross-sectional shape of the laminate plates is defined by a non-orthogonal angle extending radially outward from the shaft relative to the axis of rotation, wherein a cross-sectional shape of the laminate plates is defined by a concave curve; wherein the central support is defined by opposing side walls having a convex curved shape; wherein the central support is defined by opposing side walls having a non-orthogonal angle extending radially outward from the shaft relative to the axis of rotation; wherein a first wall of each of the endplates is defined by a concave curve; wherein a first wall of each of the endplates is defined by a non-orthogonal angle extending radially outward from the shaft relative to the axis of rotation; and at least one permanent magnet attached the laminate plates.

In another aspect the present disclosure includes a method comprising: positioning a plurality of laminate plates on a rotatable shaft within an electrical machine; positioning a central support between the plurality of laminate plates on the shaft; clamping the laminate plates together with a pair of end plates at either end of the shaft; wherein a portion of the laminate plates is positioned radially inward of a portion of the end plates; and transmitting radial loads from the laminate plates to the end plates during operation of the electrical machine.

In refining aspects, a shape of the laminate plates, a shape of the central support and a shape of the end plates cooperate to form a nested configuration; and wherein the nesting includes one of a concave curved portion and a non-orthogonal angle extending radially outward from the shaft relative to the axis of rotation.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A Method comprising:
   forming a housing for an electrical machine;
   positioning a shaft in the housing along an axis of rotation between first and second ends;
   winding a stator within the housing;
   supporting a rotor assembly radially inward of the stator;
   connecting a central support to the shaft at an intermediate position between the first and second ends;
   connecting first and second end plates to the shaft at the opposing first and second ends thereof;
   connecting a plurality of laminate plates to the shaft between the central support and the first and second end plates; and
   restricting radial growth of the laminate plates with first and second end plates; and
   wherein restricting the radial growth includes forming the laminate plates in a non-linear cross sectional shape.

2. The method of claim 1, wherein restricting the radial growth includes forming the laminate plates with a non-orthogonal angle extending radially outward from the shaft relative to the axis of rotation.

3. The method of claim 1, wherein restricting the radial growth includes forming the laminate plates in an arcuate concave shape.

4. The method of claim 1, wherein restricting the radial growth includes forming a first sidewall of each of the end plates with a non-linear shape substantially equivalent to a non-linear cross sectional shape of the laminate plates.

5. The method of claim 4, wherein each of the end plates includes a second sidewall having a different shape than that of the first sidewall.

6. The method of claim 4, wherein the first sidewall of each of the end plates includes a concave arcuate shape.

7. The method of claim 1, wherein the central support includes opposing sidewalls having a non-linear shape corresponding to the non-linear cross sectional shape of the laminate plates.

8. The method of claim 7, wherein the opposing side walls of the central support have a convex arcuate shape.

9. The method of claim 7, wherein the opposing side walls of the central support includes a non-orthogonal angle extending radially outward from the shaft relative to the axis of rotation.

10. The method of claim 1, further comprising positioning permanent magnets on a perimeter end of one or more of the laminate plates.

11. A method comprising:
    positioning a plurality of laminate plates on a rotatable shaft within an electrical machine;
    positioning a central support between the plurality of laminate plates on the shaft;
    clamping the laminate plates together with a pair of end plates at either end of the shaft;

wherein a portion of the laminate plates is positioned radially inward of a portion of the end plates;

transmitting radial loads from the laminate plates to the end plates during operation of the electrical machine;

wherein a shape of the laminate plates, a shape of the central support and a shape of the end plates cooperate to form a nested configuration; and wherein the nesting includes one of a concave curved portion and a non-orthogonal angle extending radially outward from the shaft relative to the axis of rotation.

12. The method of claim 11, further comprising positioning permanent magnets on a perimeter end of one or more of the laminate plates.

* * * * *